UNITED STATES PATENT OFFICE 2,550,119

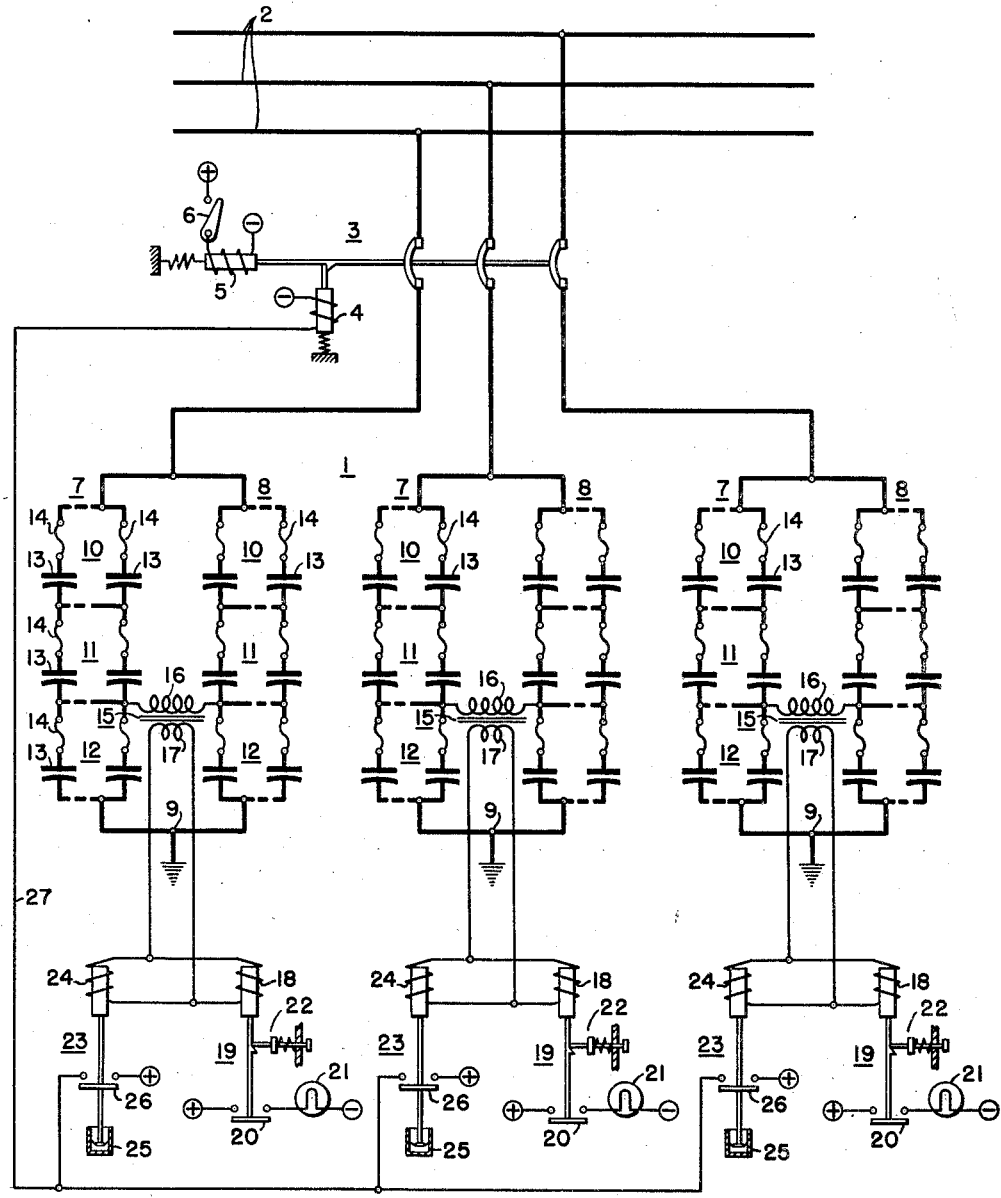

SIGNAL AND PROTECTIVE SYSTEM FOR SHUNT CAPACITOR BANKS

Ralph E. Marbury and William H. Cuttino, Pittsburgh, Pa., assignors to Westinghouse Electric Corporation, East Pittsburgh, Pa., a corporation of Pennsylvania Application August 6, 1948, Serial No. 42,848

5 Claims. (Cl. 177—311)

The present invention relates to shunt capacitor banks for alternating current transmission or distribution lines and, more particularly, to the protection of high-voltage capacitor banks against damage resulting from failure of individual capacitor units.

Capacitors are frequently connected to alternating current transmission or distribution lines in order to improve the power factor. When a relatively large amount of capacitance is required, the usual practice is to use the necessary number of relatively small individual capacitor units, of standard kva. and voltage ratings, connected together in a bank, since this results in the most economical installation. When a large number of capacitor units are connected together in parallel, or series-parallel, in this manner, the possibility of dielectric failure in one or more capacitor units is always present, and if a faulted capacitor is not immediately removed from the circuit, the internal arc in the capacitor is likely to cause rupture of the case and damage to adjacent good capacitors. For this reason, it is customary to connect an individual fuse in series with each capacitor unit, so that the fuse will blow and disconnect its capacitor from the bank immediately upon failure of the capacitor. When a fuse blows on one capacitor of a group of parallel-connected capacitors, the impedance of the group is increased, and the voltage distribution between the various groups which make up the bank, or between the several phases of the bank, is changed, so that the voltage increases on some groups and decreases on others. Standard capacitor units, of the type used for power factor correction, cannot safely be subjected to a continuous overvoltage of more than 10% of the rated voltage, and it is necessary to provide some protective means which will disconnect the capacitor bank from the line when the voltage across any group of capacitors exceeds 110% of the rated voltage.

Three-phase capacitor banks for use on lines of voltages of 13,800 volts or less are usually Y-connected with the neutral ungrounded. Capacitor banks for use on lines of higher voltage consist of two or more groups of paralleled capacitors connected in series in each phase, and the neutral is usually grounded in order to simplify the design of the capacitor bank and keep the size and cost as low as possible by reducing the amount of insulation required. One protective system which is frequently used for capacitor banks with ungrounded neutrals utilizes potential transformers connected across each phase of the bank with their secondaries connected to a relay in such a manner that the relay responds to zero sequence voltage. When the voltages across the three phases are balanced, there is no net voltage applied to the relay, but if the voltages become unbalanced, as a result of the blowing of individual capacitor fuses, the relay responds to the zero sequence voltage and effects disconnection of the capacitor bank from the line. This protective system, however, cannot be used on capacitor banks having a grounded neutral, since the relay would operate in response to a ground fault on the line, which is not permissible. This system also has the disadvantage that it is not applicable to single-phase banks.

Another scheme for protecting capacitor banks consists in dividing each phase of the bank into two similar branches connected in parallel, and comparing the currents in the two branches of each phase by means of cross-connected current transformers. Since the currents in the two branches will normally be equal, but will become unequal if the impedances of the branches become unequal, this system gives a reliable indication of unequal distribution of voltage resulting from the blowing of individual capacitor fuses. The current transformers used in this system, however, may be subjected to relatively high impulse voltages when the capacitor bank is connected to the line, and the transformers must be insulated for the full line voltage. On high-voltage lines, this requires large and expensive transformers. An improved system of this general type, utilizing less expensive differential transformers, is shown in a patent to Marbury et al., No. 2,447,658, issued August 24, 1948.

The principal object of the present invention is to provide a protective system for shunt capacitor banks which is applicable to Y-connected banks with grounded neutral, and which is relatively inexpensive.

Another object of the invention is to provide a protective system for shunt capacitor banks utilizing relatively low-voltage potential transformers for energizing relays to respond to the voltage difference between points which are at the same potential under normal conditions, so as to respond to voltage unbalance resulting from the blowing of individual capacitor fuses.

A further object of the invention is to provide a protective system for shunt capacitor banks which will provide a positive indication, or visual signal, of the blowing of a single individual capacitor fuse, and which will effect disconnection of the capacitor bank from the line when enough fuses have blown to cause a voltage across any part of the bank which is high enough to endanger the capacitors.

Other objects and advantages of the invention will be apparent from the following detailed description, taken in connection with the accompanying drawing, the single figure of which is a schematic diagram showing a preferred embodiment of the invention.

The invention is shown in the drawing applied to a three-phase shunt capacitor bank 1, which is connected to a three-phase alternating current line 2 by means of a circuit breaker 3. The circuit breaker 3 is shown as having a trip coil 4 and a closing coil 5, which may be controlled manually, as indicated by the switch 6, or automatically in any desired manner.

The capacitor bank 1 is a high-voltage, three-phase, Y-connected bank with grounded neutral. The three phases of the bank are identical, and each phase is provided with the same protective means, so that only one phase need be described in detail. Each phase of the capacitor bank 1 is divided into two similar branches 7 and 8, which are connected in parallel between the line and the grounded neutral point 9. The neutral points of the three phases may be tied together and grounded, or they may be separately grounded, as shown. In the illustrated embodiment, each of the branches 7 and 8 consists of three groups of capacitors 10, 11 and 12, which are connected in series. Each of the groups 10, 11, and 12 consists of a suitable number of individual capacitor units 13 connected in parallel, and each capacitor unit is provided with an individual fuse 14. It will be understood that, although only two paralleled capacitors have been shown in each group, any necessary number may be used, and in an actual installation, there will usually be a relatively large number of capacitor units 13 in parallel in each group.

Since the two branches 7 and 8 of each phase are connected in parallel between the line and ground, and since each branch consists of the same number of capacitor units connected in the same way, the impedances of the two branches will be equal, and the voltages at corresponding points in the two branches will be the same, under normal conditions. If one or more of the individual fuses 14 are blown, however, as a result of failure of the corresponding capacitor unit, so as to remove the faulted capacitor unit from the circuit, the impedance of the group which contained the faulted capacitor will be changed, and the voltage distribution across the branch containing that group will be changed, so that the voltages at corresponding points of the two branches 7 and 8 will no longer be the same.

The present invention utilizes this change in voltage distribution to provide protection against overvoltage on any group of capacitor units. For this purpose, a potential transformer 15 is provided, with its primary winding 16 connected between corresponding points in the two branches 7 and 8, which are normally at the same potential. It is preferred to connect the transformer immediately above the group 12 of capacitors, at the ground end of each branch, as shown, since the transformer then has to be insulated only for the voltage across the lowermost group of capacitors, which in the illustrated embodiment is one-third of the line-to-ground voltage. The secondary winding 17 of the potential transformer 15 is connected to the operating coil 18 of a relay 19, which is of a type that operates substantially instantaneously when the voltage applied to the coil 18 exceeds the pickup voltage for which the relay is adjusted. The contact 20 of the relay 19 is connected in the circuit of an indicating lamp 21, so that when the relay closes its contact 20, the lamp 21 lights to provide a visual indication of the relay operation. The relay 19 is shown as provided with a latching means 22 to hold it in the actuated position, so that the lamp 21 will continue to burn after the relay has once operated, but it is to be understood that the relay 19 may be arranged in any suitable manner to maintain energization of the circuit of the lamp 21 after the relay has once operated. It will also be understood that any other suitable signaling or indicating means may be used in place of, or in addition to, the lamp 21 to provide a signal or indication, or other desired response, when the relay 19 operates.

A slower operating relay 23 is also provided, with its operating coil 24 connected to the secondary winding 17 of the potential transformer 15. The relay 23 has been shown as a time-delay relay, as indicated diagrammatically by the dashpot 25, but it may be any type of relay which operates more slowly than the relay 19, and it is not necessarily provided with a definite time delay mechanism. The relay 23 has a contact 26 which is connected to a control circuit 27 for the trip coil 4 of the circuit breaker 3, so that when the relay closes its contact, the trip coil 4 is energized, and the breaker 3 opens to disconnect the capacitor bank 1 from the line.

The operation of this system is as follows. Under normal conditions, with all the capacitor units 13 of each phase connected to the line, the voltages across the two branches 7 and 8 of each phase are equally divided between the groups of capacitor units, and no voltage appears across the primary of the potential transformer 15. If one of the individual fuses 14 blows, as a result of failure of its capacitor, the group containing the faulted capacitor is momentarily short-circuited by the arcs in the fuse and the capacitor, and the voltage across that group falls to substantially zero. This, of course, changes the voltage distribution, and results in a momentary rise in voltage across the other groups in the same branch, causing a voltage to appear across the potential transformer 15. Thus, if a fuse blows in the lowermost capacitor group 12 of the branch 7, the voltage across that group falls to zero, and the voltage across the transformer 15 is then equal to the voltage of the corresponding group 12 of the other branch 8, which is equal to one-third of the line-to-ground voltage. For example, if the capacitor bank 1 is connected to a 34,500 volt line, the line-to-ground voltage is 19,900 volts, and the voltage across each of the three capacitor groups is normally one-third of this, or 6,630 volts. If a fuse blows in the lowermost group 12 of either branch 7 or 8, therefore, a momentary voltage of 6,630 volts appears across the potential transformer 15, which lasts for several cycles, until the fuse clears the circuit and the voltage across the affected capacitor group recovers.

If a fuse blows in either of the other groups 10 or 11, so that that group is momentarily short-circuited, half the line-to-ground voltage will appear across each of the other two groups in the same branch, and the voltage across the potential transformer 15 will be the difference between half the line-to-ground voltage and one-third of the line-to-ground voltage, or in the example given, 3,315 volts. Thus, if an individual fuse 14 blows anywhere in the bank, the corresponding potential transformer will be subjected to a large momentary voltage, which will cause the instantaneous relay 19 to pick up and close its contact 20 to light the lamp 21, or other indicating device, giving a visual indication that a fuse has blown. Since the voltage resulting from the blowing of a single fuse is maintained for only a few cycles, the slow-acting relay 23 will not respond to this voltage, and the capacitor bank is not disconnected from the line.

As previously explained, when a fuse 14 blows, the impedance of the group of paralleled capacitors is changed by the removal of the faulted capacitor, so that the voltage distribution between the several groups of the corresponding branch is changed, and it is necessary to protect the capacitor bank from a voltage increase of more than 10% on any group of capacitor units. A permanent change in the voltage distribution across either branch 7 or 8 causes a sustained voltage to appear across the potential transformer 15, which is much lower than the momentary voltage resulting from the blowing of a single fuse, and the slow-acting relay 23 is set to respond to a voltage difference of a magnitude which indicates that the voltage on one group of capacitor units has exceeded the permissible limit. Thus, if a capacitor unit 13 in the group 12 of the branch 7 fails, and causes its fuse 14 to blow to disconnect it from the circuit, the impedance of the group 12 will be increased, and the voltage across it increases, with a corresponding reduction in the voltage across the groups 10 and 11. If a sufficient number of fuses in the group 12 blows to cause the voltage across the group to rise to 110% of the normal voltage, a voltage equal to 10% of the normal voltage will appear across the potential transformer 15, since the voltage of the group 12 of the other branch 8 is still at its normal value. In the specific example given above, therefore, a voltage of 663 volts will appear across the potential transformer 15 when the voltage of either one of the groups 12 reaches 110% of normal voltage.

If a sufficient number of fuses blows in either of the groups 10 or 11 to cause the voltage across the group to exceed 110% of normal voltage, the voltage across the group 12 will be reduced to 95% of normal voltage, and a voltage equal to the difference between this and the normal voltage will appear across the potential transformer 15, which would be 332 volts in the example given. Thus, if the voltage across any group in either branch 7 or 8 rises above 110% of the normal voltage, a sustained voltage appears across the potential transformer 15, which actuates the relay 23 to energize the trip coil 4 of the breaker 3 and disconnect the capacitor bank from the line.

It should now be apparent that a protective system has been provided for high-voltage shunt capacitor banks which is applicable to Y-connected banks with grounded neutral, but which is relatively inexpensive, since low-voltage potential transformers can be used, as they do not have to be insulated for a voltage higher than the normal voltage across the group of capacitors nearest ground. The potential transformer is protected from surges by the capacitors themselves, which are between the transformer and both line and ground, and no impulse voltages resulting from energizing the capacitor bank will be impressed on the transformer because of the balanced connection. The protective system operates to give an immediate and positive indication of the blowing of a single individual fuse 14 anywhere in the bank, but it does not disconnect the bank from the line until the voltage across any group of capacitors has become high enough to endanger the capacitors, so that the bank is not removed from the line until it is necessary to do so, but a positive indication is given that one or more capacitors have failed and should be replaced. It will be apparent that various modifications may be made. Thus, the relays 19 might be omitted, if indication of failure of a single fuse is not desired, and if relays 19 are used, they may be utilized to actuate any desired type of signaling or indicating means. The circuit breaker 3 may be controlled either manually or automatically in any desired manner, and additional means may be provided for controlling the trip coil 4, either manually or automatically, for switching the capacitor bank 1 under normal conditions.

A specific embodiment of the invention has been shown and described, for the purpose of illustration, but it is to be understood that various modifications may be made, and that the invention is not limited to the specific arrangement shown, but in its broadest aspects it includes all equivalent embodiments and modifications which come within the scope of the appended claims.

We claim as our invention:

1. A capacitor bank adapted to be connected in shunt to an alternating current line, said capacitor bank including two similar parallel-connected branches, each of said branches comprising a plurality of series-connected groups of capacitor units and each group comprising a plurality of capacitor units connected in parallel, an individual fuse connected in series with each capacitor unit, means for connecting the capacitor bank in shunt to the line, and means responsive to the voltage difference between points in the two branches which are at the same potential under normal conditions for indicating operation of a single one of said individual fuses in response to a momentary voltage difference in excess of a predetermined value and for effecting disconnection of the capacitor bank from the line in response to a sustained voltage difference in excess of a lower predetermined value.

2. A capacitor bank adapted to be connected in shunt to an alternating current line, said capacitor bank including two similar parallel-connected branches, each of said branches comprising a plurality of series-connected groups of capacitor units and each group comprising a plurality of capacitor units connected in parallel, an individual fuse connected in series with each capacitor unit, means for connecting the capacitor bank in shunt to the line, means responsive to the voltage difference between points in the two branches which are at the same potential under normal conditions for indicating the occurrence of a momentary voltage difference between said points in excess of a predetermined value, and means responsive to the voltage difference between said points for effecting disconnection of the capacitor bank from the line in response to a sustained voltage difference of lower predetermined value.

3. A capacitor bank adapted to be connected in shunt to an alternating current line, said capacitor bank including two similar parallel-connected branches, each of said branches comprising a plurality of series-connected groups of capacitor units and each group comprising a plurality of capacitor units connected in parallel, an individual fuse connected in series with each capacitor unit, means for connecting the capacitor bank in shunt to the line, relay means responsive to the voltage difference between corresponding points in the two branches for indicating the occurrence of a momentary voltage difference between said points in excess of a predetermined value, and relay means for effecting disconnection of the capacitor bank from the line in response to a sustained voltage difference between said points in excess of a lower predetermined value.

4. A capacitor bank adapted to be connected in shunt to an alternating current line, said capacitor bank including two similar parallel-connected branches, each of said branches comprising a plurality of series-connected groups of capacitor units and each group comprising a plurality of capacitor units connected in parallel, an individual fuse connected in series with each capacitor unit, means for connecting the capacitor bank in shunt to the line, a relay responsive to the voltage difference between corresponding points in the two branches, indicating means, said relay being adapted to effect energization of said indicating means in response to a momentary voltage difference between said points in excess of a predetermined value, and a slow-acting relay responsive to the voltage difference between said points for effecting disconnection of the capacitor bank from the line in response to a sustained voltage difference in excess of a lower predetermined value.

5. A capacitor bank adapted to be connected in shunt to an alternating current line, said capacitor bank including two similar parallel-connected branches, each of said branches comprising a plurality of series-connected groups of capacitor units and each group comprising a plurality of capacitor units connected in parallel, an individual fuse connected in series with each capacitor unit, means for connecting the capacitor bank in shunt to the line, a potential transformer connected between corresponding points in the two branches, a relay energized from said transformer, indicating means, said relay being adapted to effect energization of said indicating means in response to a momentary voltage in excess of a predetermined value, and a slow-acting relay energized from said transformer and adapted to effect disconnection of the capacitor bank from the line in response to a sustained voltage in excess of a lower predetermined value.

RALPH E. MARBURY.
WILLIAM H. CUTTINO.

REFERENCES CITED

The following references are of record in the file of this patent:

UNITED STATES PATENTS

| Number | Name | Date |
|---|---|---|
| 2,320,929 | Hodnette | June 1, 1943 |
| 2,333,537 | Leonard | Nov. 2, 1943 |
| 2,376,201 | Starr | May 15, 1945 |
| 2,447,658 | Marbury et al. | Aug. 24, 1948 |